(12) United States Patent
Vu

(10) Patent No.: US 9,280,161 B2
(45) Date of Patent: Mar. 8, 2016

(54) MULTIFLEX COUPLING

(71) Applicant: Kim Ngoc Vu, Yorba Linda, CA (US)

(72) Inventor: Kim Ngoc Vu, Yorba Linda, CA (US)

(73) Assignee: VISTADELTEK, LLC, Yorba Linda, CA (US)

( * ) Notice: Subject to any disclaimer, the term of this patent is extended or adjusted under 35 U.S.C. 154(b) by 389 days.

(21) Appl. No.: 13/794,517

(22) Filed: Mar. 11, 2013

(65) Prior Publication Data

US 2014/0202560 A1 Jul. 24, 2014

Related U.S. Application Data

(60) Provisional application No. 61/685,116, filed on Mar. 12, 2012.

(51) Int. Cl.
*G05D 7/06* (2006.01)
*H02N 2/04* (2006.01)

(52) U.S. Cl.
CPC ............ *G05D 7/0635* (2013.01); *H02N 2/043* (2013.01); *Y10T 137/7758* (2015.04)

(58) Field of Classification Search
CPC ............................ G05D 7/0635; H02N 2/043
USPC .............................................. 251/129.2, 232
See application file for complete search history.

(56) References Cited

U.S. PATENT DOCUMENTS

| | | | |
|---|---|---|---|
| 144,048 A * | 10/1873 | Ball | F16K 99/0001 137/1 |
| 1,050,431 A * | 1/1913 | Darrin | F16K 31/10 236/30 |
| 4,558,605 A | 12/1985 | Tanner | |
| 4,569,504 A | 2/1986 | Doyle | |
| 4,695,034 A | 9/1987 | Shimizu et al. | |
| 4,903,942 A | 2/1990 | Licciardello | |
| 5,094,430 A | 3/1992 | Shirai et al. | |
| 5,660,207 A | 8/1997 | Mudd | |
| 6,178,996 B1 | 1/2001 | Suzuki | |
| 2015/0059877 A1* | 3/2015 | Vu | H02N 2/043 137/487.5 |

FOREIGN PATENT DOCUMENTS

EP 0066375 A1 12/1982

OTHER PUBLICATIONS

International Search Report and Written Opinion issued on Dec. 11, 2014 for related PCT App. No. PCT/US2014/024970.

* cited by examiner

*Primary Examiner* — Terence Boes
(74) *Attorney, Agent, or Firm* — Stout, Uxa & Buyan, LLP; Donald E. Stout

(57) ABSTRACT

A compact, easily manufactured, axisymmetric mechanism can be configured to change the magnitude of a short-movement linear motion, or also reverse the movement direction, of an actuator for control of movable elements. The mechanism is bidirectional and reversible, functioning symmetrically, and does not contain any gears nor lead screw threads. It is constantly loaded, so that force change is achieved without mechanical backlash, introducing hysteresis. The movement conversion is generally proportional and suitable for use in actuating a fluid control valve intended for modulating the control of fluids.

16 Claims, 12 Drawing Sheets

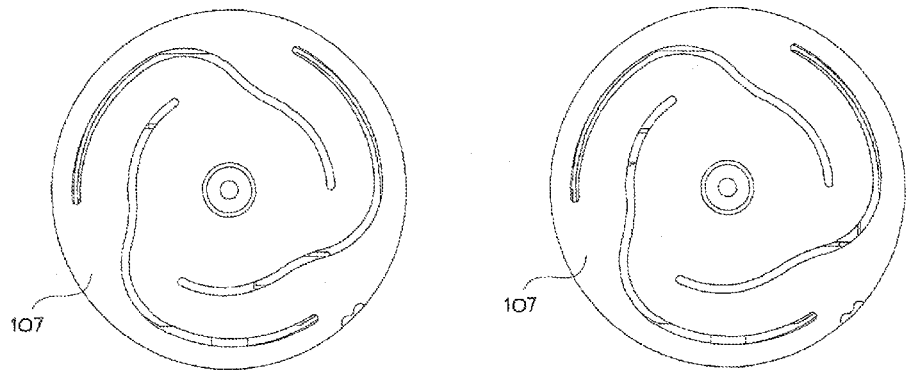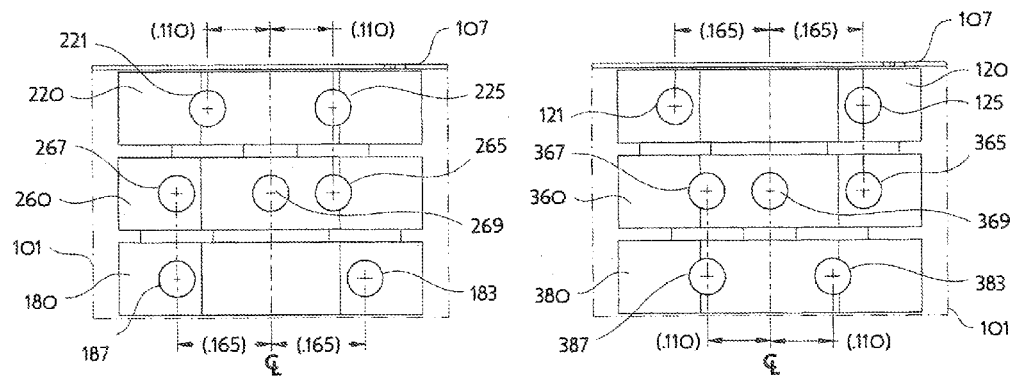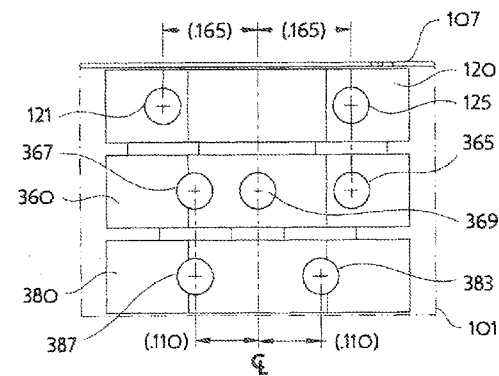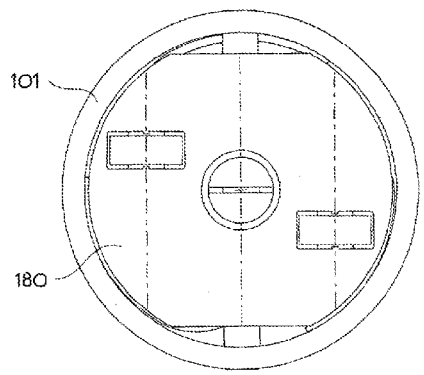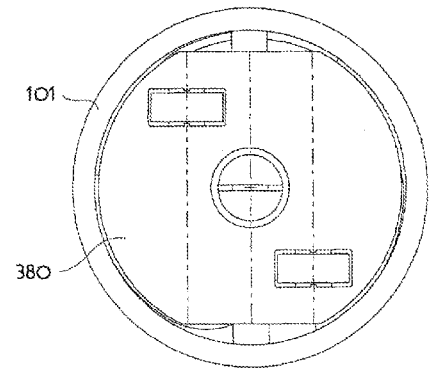
FIG. 4B   FIG. 4C

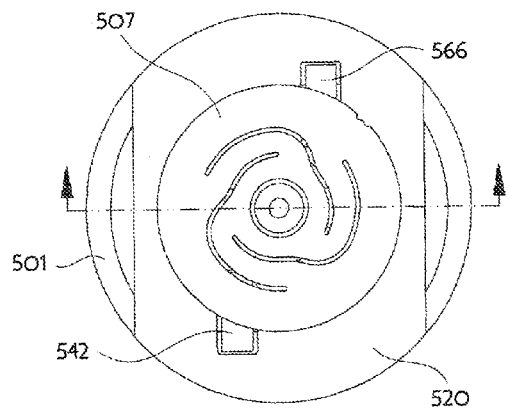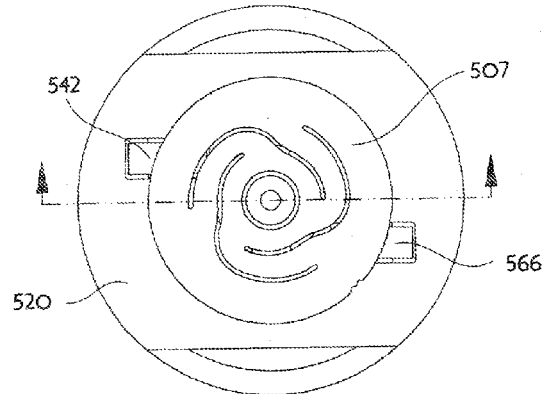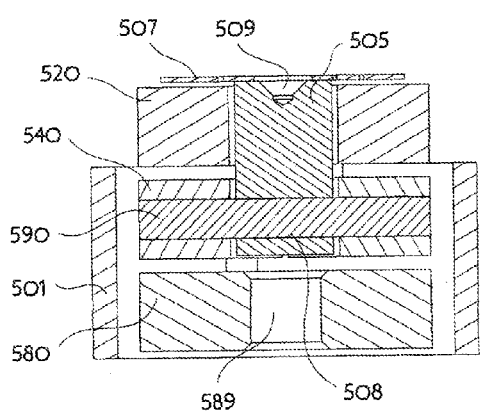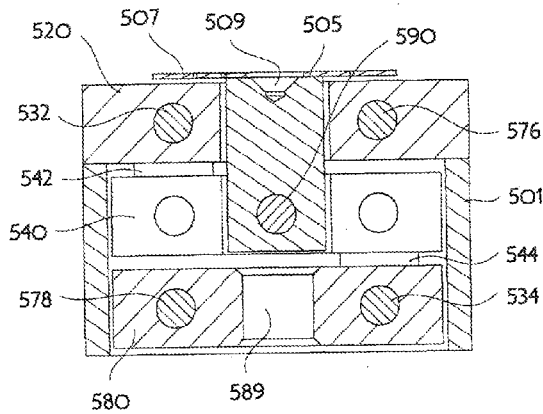
FIG. 5A  FIG. 5B
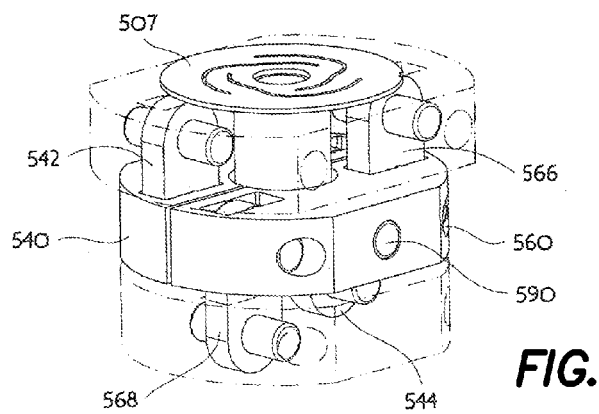
FIG. 5C

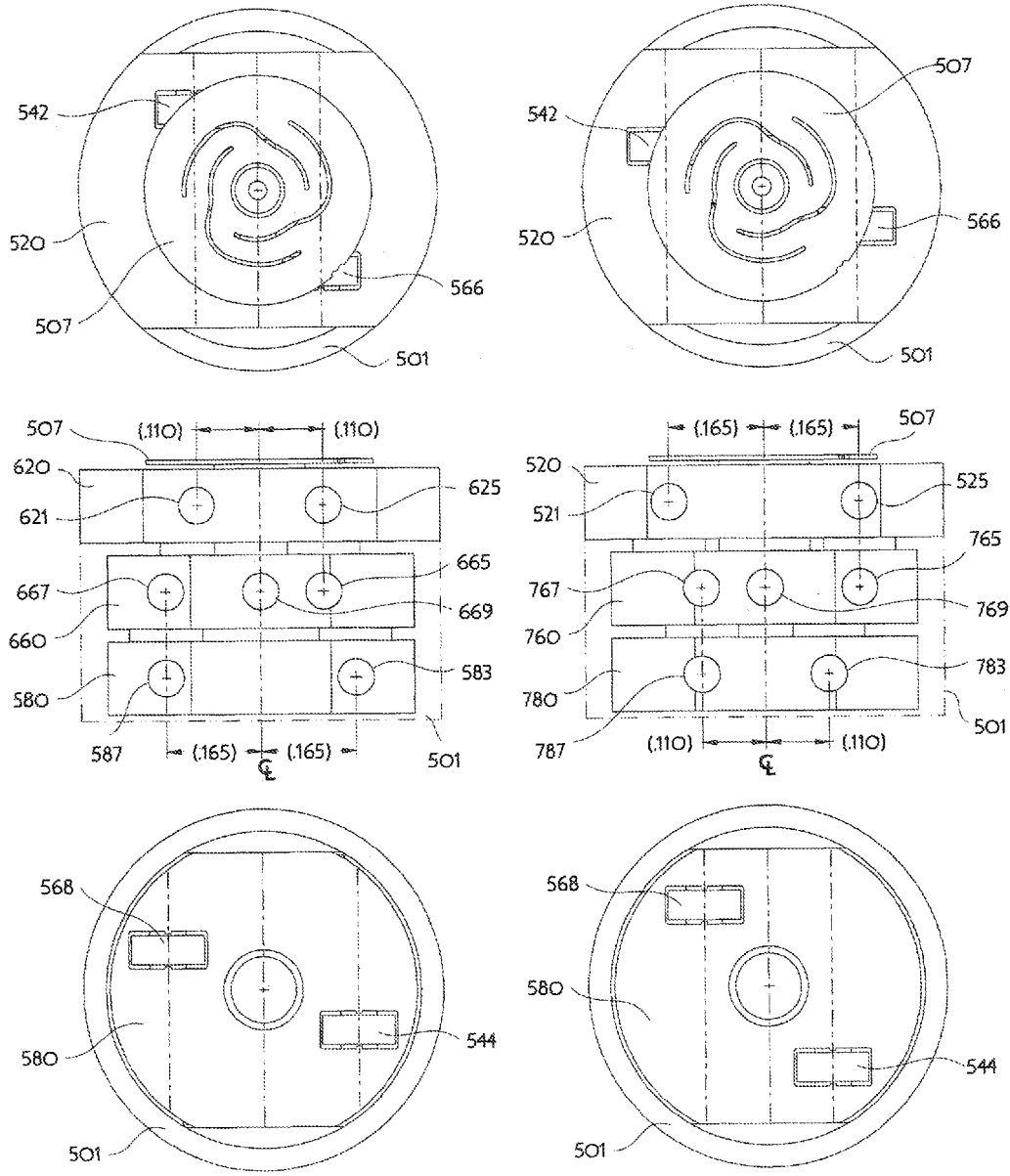

MULTIFLEX COUPLING

This application claims the benefit under 35 U.S.C. 119(e) of the filing date of Provisional U.S. Application Ser. No. 61/685,116, entitled Multiflex Coupling, filed on Mar. 12, 2012, which is commonly owned and expressly incorporated herein by reference, in its entirety.

FIELD OF THE INVENTION

The present invention is related to a parallel motion mechanism with a circular shape that is well suited for use in axisymmetric devices like the modulating actuator of a proportional control valve. Various arrangements of the mechanism can change both the magnitude and direction of actuator motion. The movement conversion is generally proportional and suitable for use in actuating a fluid control valve. The invention is particularly useful in valves intended for proportional or modulating control of fluid delivery within industrial processes making semiconductor devices, pharmaceuticals, or fine chemicals, and many similar fluid delivery systems.

BACKGROUND OF THE INVENTION

The field of control valves intended for use within automated process control systems is broad and well known. Many proportional control valves have one or more movable elements that may be actively positioned, anywhere between an extreme open condition and an extreme closed condition, to adjust the flow of fluid passing therethrough. Fluid delivery apparatus intended for manipulating process materials within semiconductor manufacturing equipment usually require attention to the maintenance of high purity of the delivered reactants, and also are typically much smaller than valves used in petrochemical actuators are found in high purity instrumentation and control apparatus, such as mass flow controllers. U.S. Pat. No. 4,695,034 to Shimizu et al. describes the use of a stack of piezoelectric disc elements to effect movement of valve parts in a mass flow controller. U.S. Pat. No. 4,569,504 to Doyle describes the use of a magnetic solenoid with interleaved magnetic circuit elements. U.S. Pat. No. 5,660,207 to Mudd describes the use of a heated resistance wire that changes length with temperature changes in order to effect valve element movement. U.S. Pat. No. 6,178,996 to Suzuki describes the use of a pressurized fluid, such as nitrogen gas, to control the degree of opening of a diaphragm-operated control valve. All of the foregoing patents are herein expressly incorporated by reference, in their entirety.

One important disadvantage of both magnetic solenoid and thermal expansion type actuators is inherent constant power consumption when controlling valve elements positioned at an intermediate condition, such as when actively regulating fluid flow. A piezoelectric actuator is effectively a capacitor in an electrical circuit, and therefore does not consume current when an applied voltage is constant. Consequently, typical piezoelectric control valve applications only require low power and avoid the undesirable generation of heat found in electromagnetic actuators. A piezoelectric actuator advantageously may produce substantially more force than a solenoid actuator of comparable size, but achievable strain severely limits the distance a piezoelectric stack can move. Piezoelectric actuators nearly always are used in a manner wherein applying an activation voltage causes an extensional increase in the stack length (see the Shimizu et al. '034 patent as well as U.S. Pat. No. 5,094,430 to Shirai et al., which is also herein expressly incorporated by reference, in its entirety). Shimizu et al. '034 increases the available movement by interposing a force transmission member, comprising a plurality of radial lever-arm tongues, between the stack of piezoelectric disc elements and the moving portion of the control valve. The Shimizu force transmission members are complicated and difficult to manufacture correctly. Shirai et al. '430 describe the use of a spherical bearing to couple movement from a stack of piezoelectric disc elements to other portions of the control valve to prevent adverse effects otherwise resulting from insufficient parallelism of parts. The use in the Shirai et al. system of a spherical bearing appears to preclude the use of Shimizu's force transmission member. Magnetic solenoid actuators nearly always affect driven element movement analogous to a decrease in length along the actuator axis (see Doyle '504 for example), which is the opposite of piezoelectric actuator behavior. A consequence of these actuator differences is piezoelectric actuators being most likely associated with normally open valves (wherein applying power then causes the valve to decrease fluid flow) and magnetic solenoid actuators being most likely associated with normally closed valves (wherein applying power then causes the valve to increase fluid flow). A valve designer will benefit from having a mechanism to reverse the direction of actuator motion, or change the effective magnitude of actuator motion, to thereby allow both normally open and normally closed valves to use a single actuator type (piezoelectric, magnetic solenoid, pneumatic, etc.).

SUMMARY OF THE INVENTION

The present invention addresses the issues noted above, by providing a compact, easily manufactured system which can be configured to change the movement magnitude, or also reverse the movement direction, of an actuator for control of movable elements in a valve regulating fluid flow. The inventive mechanism is bidirectional and reversible, functioning symmetrically insofar as the naming conventions of "driving" and "driven", "active" and "reactive", and the like. The invention contemplates the use of linear motion force generators known to provide controlled, incremental movement as required in a proportional modulating valve. In a first configuration, the linear active direction motion (driving portion) from the force generator is reversed in direction to provide reactive direction motion (driven portion) having opposite direction. In a second configuration, the linear active direction motion (driving portion) from the force generator is typically doubled in magnitude to provide increased reactive direction motion (driven portion) in the same direction. The mechanism is referenced as a "multiflex coupling" because it can conveniently provide translational gain and direction change when used to couple an actuator to the movable portion of a valve. The mechanism does not contain any gears nor lead screw threads, and in usual practice is constantly loaded, so force change is achieved without mechanical backlash introducing hysteresis. The following direction may use notional directions (up and down, above and below, left and right, front and back, etc.) to assist understanding of relationships among the mechanism pieces, and the drawing figures generally match those notional directions or conventions, but it should be appreciated that an apparatus falling within the confines of the inventive concepts may attain any orientation in space, including actively translating or rotating or tumbling, without effect on the mechanism function.

In a typical embodiment, the mechanism is comprised of two disk-shaped elements (the driving-active and driven-reactive portions), two semicircular elements (rockers) that behave as levers, four link elements that connect the foregoing to each other, and nine pins that serve to hold together the elements, as well as an optional supporting sleeve. These various pieces may be made from a variety of materials, such as metals, plastics, composites, or ceramics, but heat treated tool steels, such as A2, D2, or H13 are considered appropriate to many applications, while aluminum alloys such as 6061 may also be used. In one embodiment, the disk-shaped active and reactive elements have an outside diameter of about 0.6 inches, outer dimensions of the semicircular rocker elements generally match the disk-shaped elements, and the mechanism has an axial length of about 0.5 inches.

The disk-shaped active and reactive elements in any mechanism configuration of the invention are each pierced by two symmetrically placed axial slots to accommodate the ends of two link elements. The axial slot locations might differ depending upon the specific translational multiplication (gain) desired from a particular mechanism. Each active and reactive element is also pierced by two lock pin holes that respectively intersect the axial slots accommodating link elements, which lock pin holes appear as symmetrically parallel cords of the element disk shape. The two semicircular rocker elements are identical within any particular mechanism configuration, as are the four links, while the active and reactive disk-shaped elements might be identical, or they may differ. Each semicircular rocker element is about the size of one-half of a disk-shaped active or reactive element, and is also pierced by two axial slots to accommodate the ends of two link elements. Each rocker element is also pierced by a radial pivot pin hole located on the half diameter perpendicular to the straight side of its semicircular shape and is additionally pierced by two lock pin holes, parallel to the pivot pin hole, that respectively intersect the axial slots accommodating links.

A complete mechanism assembly includes an upper disk-shaped element, two rocker elements placed side-by-side and below the upper disk, and a lower disk-shaped element under the rocker elements. A single pivot pin passes through the pivot pin hole of the two semicircular rocker elements and eight lock pins secure the ends of four links within respective axial slots in the several elements. Two links descend from the two axial slots of the upper disk-shaped element, and each link engages a corresponding axial slot in the below adjacent rocker element (one skilled in the art will note that the identical rocker elements appear as mirror images). Two additional links descend from the second axial slot of each rocker element and each link engages a corresponding axial slot in the below adjacent lower disk-shaped element.

Two disk-shaped active or reactive element variants may be combined with two semicircular rocker element variants to create mechanisms of the first configuration, providing three different direction-changing translational gains. Similarly, two disk-shaped active or reactive element variants may be combined with the two semicircular rocker element variants to create mechanisms of the second configuration providing three different direction preserving translational gains. Additional translational gain ratios clearly may be obtained by changing the rocker element variants, but the described easy permuting of parts is important for reduced manufacturing costs.

In accordance with one embodiment of the inventive mechanism, the pivot pin is made passive and held axially fixed relative to the bulk of an actuator, and extension of the actuator moves the active upper disk-shaped element axially away from the actuator bulk, while the reactive lower disk-shaped element of the mechanism retracts toward the actuator bulk. The axial movement of the active upper disk-shaped element is coupled to the rocker elements by the attached link pointing upwardly from each rocker. The rocker elements are thereby caused to slightly rotate about the pivot pin and downward motion of the one end of each rocker results in corresponding upward motion of the other end of each rocker. The reactive lower element translates axially in proportion to motion of the active upper element, but in an opposite direction. It will be appreciated that in this embodiment the active element is closer to the actuator bulk than is the reactive element, and the mechanism appears to lengthen. The passive pivot pin placed through pivot pin holes bored on a diameter of the side-by-side semicircular rocker elements may be conveniently held axially fixed by engaging similar diametrically opposite holes in a supporting sleeve or equivalent body surrounding the mechanism. The proportionality between motion of the active element and motion of the reactive element may be adjusted by choice of the separation between the lock pin holes and the pivot pin hole in the pair of rocker elements.

In accordance with another embodiment of the inventive mechanism, the upper disk-shaped element is made passive and held axially fixed relative to the bulk of an actuator, and extension of the actuator is coupled to the pivot pin that functions in an active manner, whereby extension of the actuator moves the active pivot pin axially away from the actuator bulk while the reactive lower disk-shaped element of the mechanism also extends away from the actuator bulk. One end of each rocker element is held axially fixed by the attached link pointing upwardly from each rocker coupled to the axially fixed upper disk-shaped passive element. Axial movement of the actuator displaces an active shaft that passes through the upper disk-shaped passive element, and engages the active pivot pin whereby axial movement of the active pivot pin is directly coupled to the rocker elements. The rocker elements are thereby caused to slightly rotate about the lock pin of the respective upwardly pointing link at one end of each rocker and downward motion of the middle of each rocker (imparted by the pivot pin) results in further downward motion of the other end of each rocker. The downward moving other end of each rocker is coupled to the reactive lower disk-shaped element by the attached link pointing downwardly from each rocker. The reactive lower element translates axially in proportion to motion of the active upper element in the same direction. It will be appreciated that in this embodiment the active element is closer to the actuator bulk than is the reactive element, and the mechanism appears to lengthen while the actuator also appears to lengthen. The upper disk-shaped passive element may be conveniently held fixed in a supporting sleeve or equivalent body surrounding the mechanism. The proportionality between motion of the active shaft and motion of the reactive element may be adjusted by choice of the separation between the lock pin holes and the pivot pin hole in the pair of rocker elements.

More particularly, there is provided a mechanical motion converter which comprises an active element, a reactive element, a pivot pin, and at least one rocker element for pivoting about the pivot pin. The rocker element is disposed axially between the active element and the reactive element. In operation, the active element, the reactive element, and the at least one rocker element are joined together and translate axially in response to a force exerted by an actuator. In the illustrated embodiments, each of the active element and the reactive element are disk-shaped. The at least one rocker element comprises a left rocker element and a right rocker element, wherein each of the rocker elements are pivotally supported by the pivot pin. In some illustrated embodiments, the pivot pin is passive, such that it is axially fixed within the mechanism. In other embodiments, the pivot pin is active, such that it is axially translatable relative to remaining portions of the mechanism.

Each of the rocker elements comprise an upward link and a downward link. In the illustrated embodiments, each of the links comprises a flat member having a hole therethrough and rounded ends.

Additional features of the inventive mechanical motion converter include a hole in each of the links, and a hole in each of the active element and the reactive element. A plurality of lock pins are provided for engaging corresponding holes in the links and the active and reactive elements to secure the active element, the links, and the reactive element together in a manner permitting relative axial movement of each joined component. The system further comprises a hole in each of the rocker elements for receiving one or more of the lock pins to further secure the active element, the links, and the active and reactive elements together. An axial slot is provided in each of the active element and the reactive element for receiving an end of a corresponding one of the links. Additionally, an axial slot is provided in each of the rocker elements, for receiving an opposing end of links extending from one of the active element and the reactive element. Preferably, each of the active element, the reactive element, and the left and right rocker elements comprise two axial slots for receiving lock pin ends. A flat disk spring is attached to an upper surface of the active element.

Each of the rocker elements comprises a hole for receiving the pivot pin and two holes for receiving lock pins, the two lock pin holes being disposed on opposed sides of the pivot pin hole. In some embodiments, the two lock pin holes on each rocker element are substantially identically spaced from the pivot pin hole, and axial movement of the active element is substantially equal to axial movement of the reactive element responsive to a force applied by an actuator. In other embodiments, the two lock pin holes on each rocker element are differently spaced from the pivot hole, and axial movement of the active element is greater than axial movement of the reactive element responsive to a force applied by an actuator, or, alternatively, axial movement of the active element is less than axial movement of the reactive element responsive to a force applied by an actuator. Additionally, in some embodiments, the active element and the reactive element move in the same axial direction responsive to a force applied by an actuator, while in other embodiments, the active element and the reactive element move in opposing axial directions responsive to a force applied by an actuator. These operational characteristics are selectable by the user, according to desired operational results, merely by designing or changing out certain components of the mechanical coupling system, as described in more detail below.

The invention, together with additional features and advantages thereof, may be best understood by reference to the following description taken in conjunction with the accompanying illustrative drawings. In these accompanying drawings, like reference numerals designate like parts throughout the figures.

BRIEF DESCRIPTION OF THE DRAWINGS

FIG. 4B is an elevation view of another embodiment of the assembly (similar to FIG. 1A) illustrating the placement of lock pins relative to the fixed pivot pin for direction reversing motion and increased displacement (1.0:1.5 gain);

FIG. 4C is an elevation view of yet another embodiment of the assembly (similar to FIG. 1A) illustrating the placement of lock pins relative to the fixed pivot pin for direction reversing motion and decreased displacement (1.5:1.0 gain);

FIG. 5A is a sectioned view of the mechanism of FIG. 5D cleaved axially along diameter line A-A, wherein the active pivot pin is cut along its length and the active shaft is shown;

FIG. 5B is a sectioned view of the mechanism of FIG. 5D cleaved axially along diameter line B-B wherein the active shaft is shown and the straight side of one semicircular rocker is illustrated;

FIG. 5C is an isometric perspective view revealing interior parts of the mechanism of FIG. 5D by illustrating some elements in phantom outline only;

FIG. 8B is an elevation view of another embodiment of the assembly (similar to FIG. 5D) illustrating the placement of lock pins relative to the active pivot pin for direction preserving motion with increased displacement (1.0:2.5 gain); and FIG. 8C is an elevation view of yet another embodiment of the assembly (similar to FIG. 5D) illustrating the placement of lock pins relative to the active pivot pin for direction preserving motion and slightly decreased displacement (1.0:1.6 gain).

DETAILED DESCRIPTION OF THE INVENTION

Figure 1A:
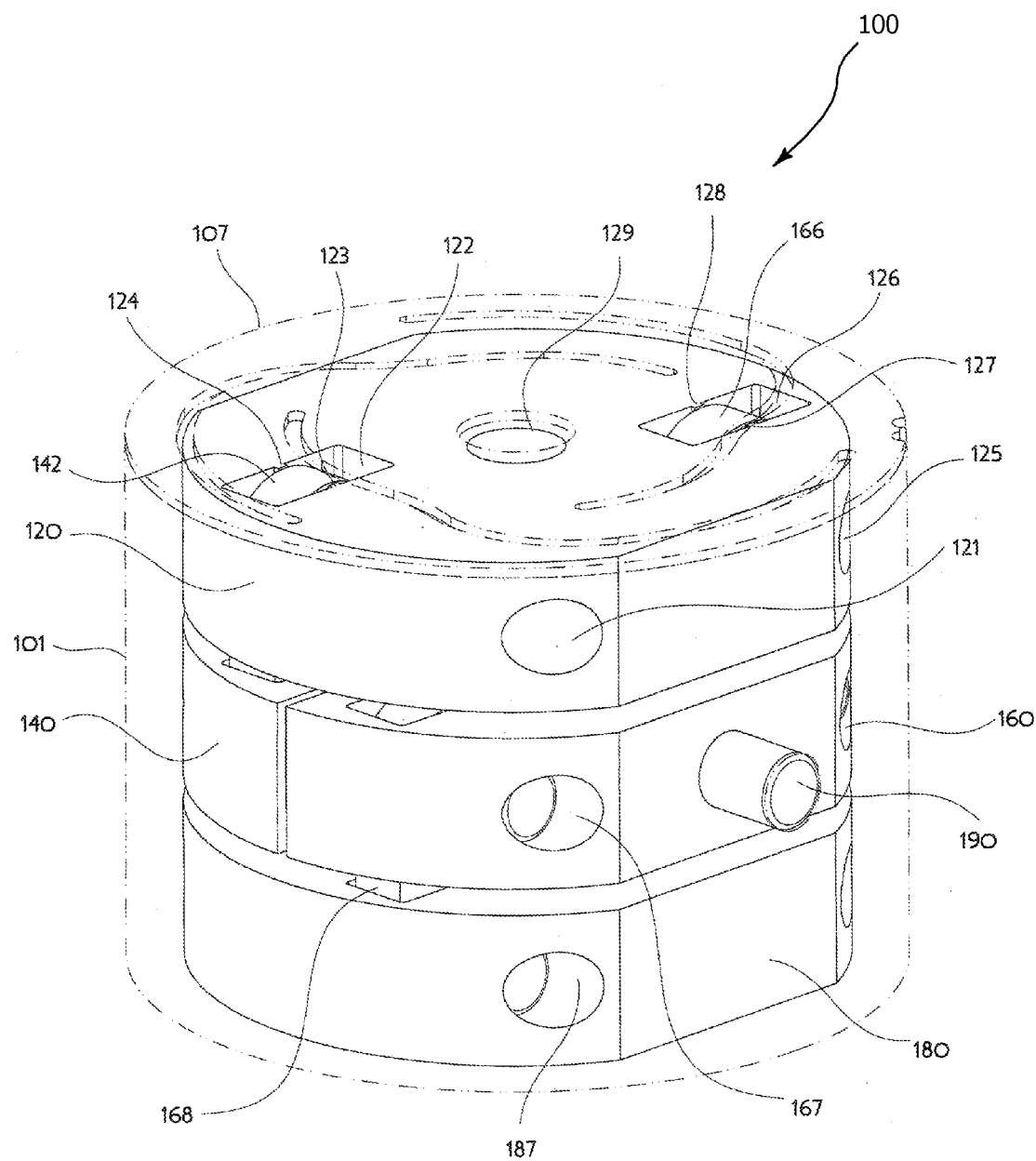
FIG. 1A is an isometric perspective view of one embodiment of the inventive direction reversing mechanism, wherein the disk-shaped active element is upward and nearest to the actuator.
Figure 1C:
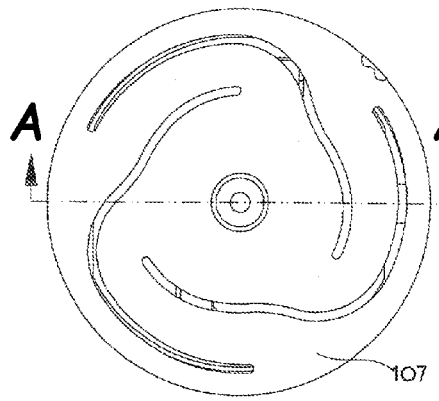
FIG. 1C is a top view of the mechanism of FIG. 1A in a first orientation.
Figure 1D:
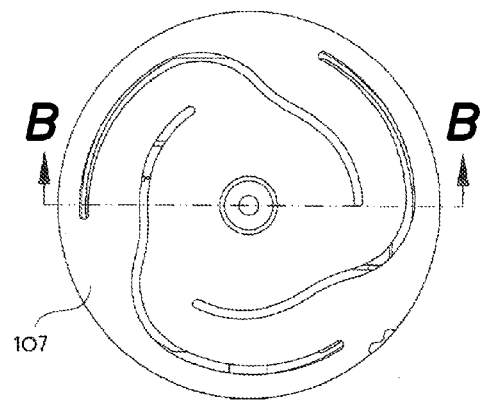
FIG. 1D is a top view similar to FIG. 1C, wherein the mechanism has been rotated a predetermined distance in a counterclockwise direction.

Referring now more particularly to the drawing figures, wherein like reference numerals designate identical or corresponding parts throughout the several views and embodiments, there is shown in FIG. 1A an embodiment of a direction reversing assembly 100 constructed in accordance with the principles of the present invention. The assembly 100 comprises a disk-shaped active element 120 disposed nearest to an actuator (not shown), typically for a valve, as discussed above, though other applications are within the scope of the invention as well. Directly below the disk-shaped active element 120 is a semicircular left rocker element 140 and an adjacent semicircular right rocker element 160, both of which are supported by a passive pivot pin 190. Directly below the rocker elements 140, 160 is a disk-shaped reactive element 180 nearest to movable elements of a valve (not shown) to be actuated. The mechanism assembly 100 may be fabricated of a variety of materials, such a metals, plastics, composites, or ceramics, but heat-treated tool steels, such as A2, D2, or H13, or a heat-treated stainless steel having spring-like characteristics, such as 17-4PH alloy, are considered appropriate to many applications, while aluminum alloys such as 6061 may also be used. The direction-reversing mechanism assembly 100 of the embodiment shown in FIG. 1A may, in one particular application, have an outside diameter of about 0.6 inch with an axial length of about 0.5 inch, and may optionally be surrounded by a sleeve 101, which is represented using phantom lines in FIG. 1A.

Mechanical action of the direction reversing mechanism assembly 100 may be understood by appreciating that slight rotation of a rocker element 140, 160 about the passive pivot pin 190 results in one end of the rocker element moving upwardly toward the active element 120, while simultaneously the other end of the same rocker element moves downwardly toward the reactive element 180. Appropriate mechanical coupling of one end of each rocker element 140, 160 to the active element 120, in combination with similar mechanical coupling of the corresponding other end of each rocker element 140, 160 to the reactive element 180, causes the active element 120 and reactive element 180 to move in opposing directions. The mechanical coupling of the active element, two rocker elements 140, 160, and the reactive element 180 will be further described below, in conjunction with a review of additional drawing figures.

Figure 1E:
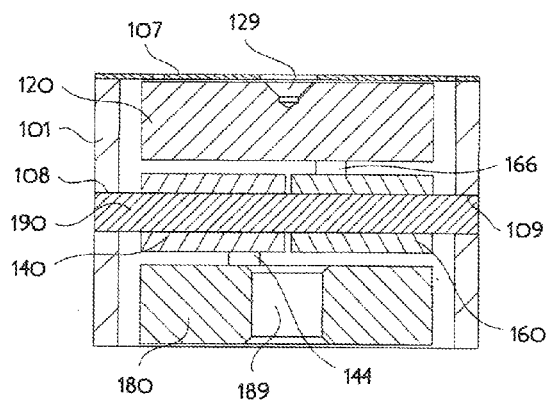
FIG. 1E is a cross-sectional view of the mechanism of FIG. 1A, taken along the diametral line A-A of FIG. 1C, showing the passive pivot pin cut along its length.
Figure 1F:
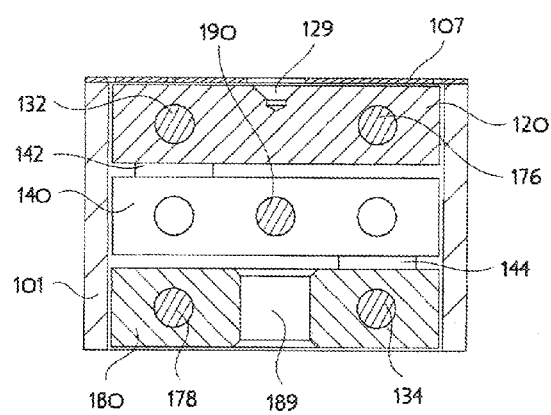
FIG. 1F is a cross-sectional view of the mechanism of FIG. 1A, taken along the diametral line B-B of FIG. 1C, wherein the straight side of one semicircular rocker is shown.
Figure 1B:
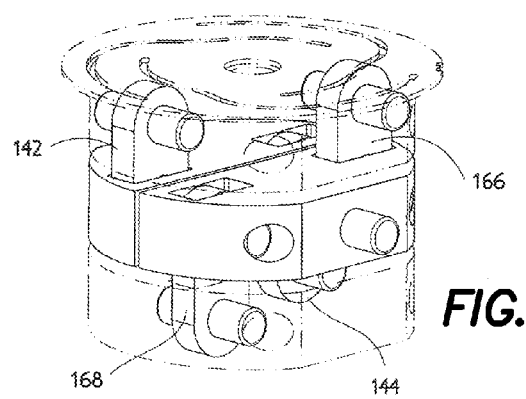
FIG. 1B is an isometric perspective view revealing interior parts of the mechanism of FIG. 1A by illustrating some elements in phantom outline only.
Figure 2:
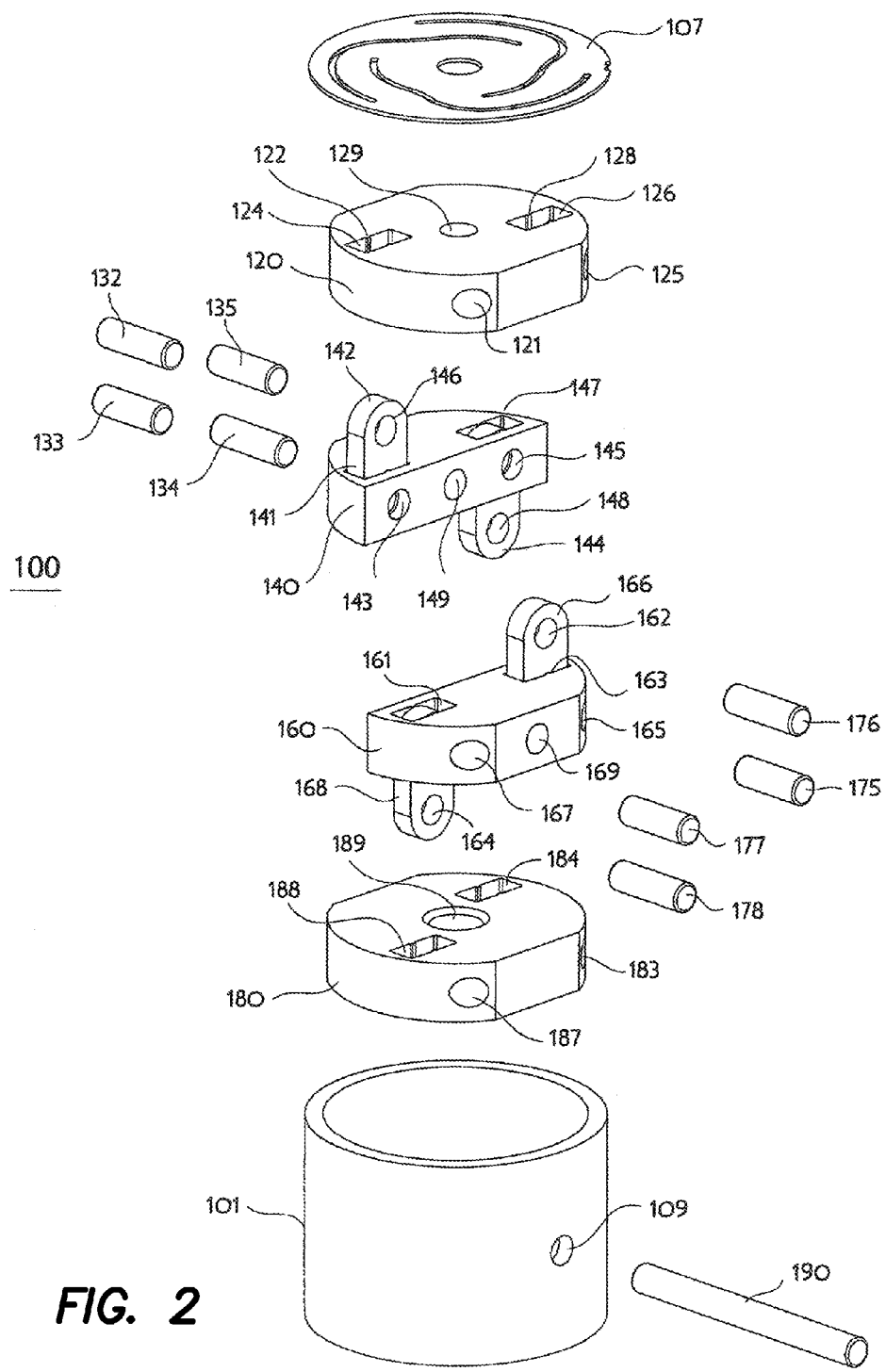
FIG. 2 is an exploded view of the direction reversing mechanism of FIG. 1D.
Figures 3A, 3B:
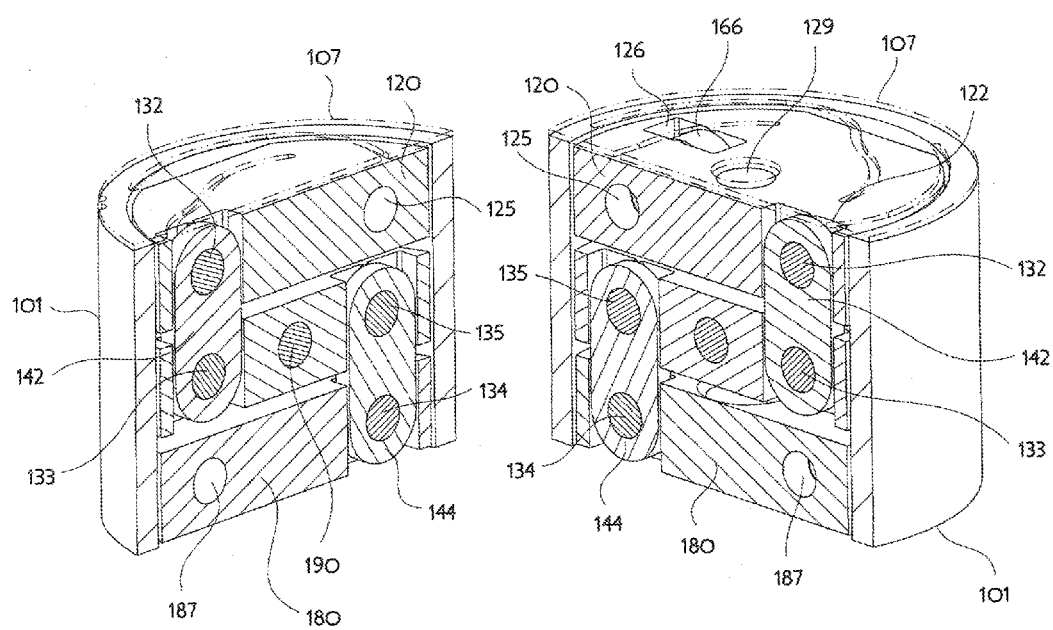
FIG. 3A is a perspective view of a portion of the mechanism of FIG. 1A, axially sectioned along a cord bisecting the upward and downward links of a rocker element.
FIG. 3B is a perspective view of the remaining portion of the mechanism of FIG. 3A, revealing the second axial slot in the upper active element, wherein another link is engaged to couple with the other rocker element.

A typical approach for coupling the rocker elements 140, 160 to the active element 120 and the reactive element 180 is by use of links and lock pins. For convenience of identification only, links connecting the rocker elements 140, 160 to the active element 120 are referred to as upward links 142, 166 (FIG. 1A), while links connecting rocker elements 140, 160 to the reactive element 180 are referred to as downward links 144, 168 (FIG. 1B). Upward links 142, 166 and downward links 144, 168 may be of various shapes (circular or rectangular cross-section, for example), but a simple flat part with circular holes through the thin dimension, and rounded ends about those holes, is conveniently manufactured. To preserve symmetry and proper function of the direction-reversing mechanism assembly 100, upward links 142, 166 are generally identical and downward links 144, 168 are generally identical, but the upward links may differ in configuration and appearance from the downward links. With reference particularly to FIG. 2, it can be seen that the upward link 142 has a hole 146 therethrough, the upward link 166 has a hole 162 therethrough, the downward link 144 has a hole 148 therethrough, and the downward link 168 has a hole 164 therethrough. Corresponding lock pins 132, 176, 134, and 178 are arranged for insertion into holes 146, 162, 148, and 164, respectively, for effecting connection between a link and an appropriate element of the direction reversing mechanism assembly 100.

Continuing with reference particularly to FIG. 2, the upper disk-shaped active element 120 is pierced by two axial slots 122, 126 located in mirror symmetry about the center of the active element 120. A left axial slot 122 is located, for example, forward and to the left of the disk center, while a right axial slot 126 is placed in the mirrored location rearward and to the right of the disk center. The axial slots 122, 126 are shaped and configured to receive ends of the upward links 142, 166 that project from the left and right rocker elements 140, 160 positioned below the active element 120. Each axial slot 122, 126 is intersected by a corresponding lock pin hole 121, 125, respectively, with the lock pin holes being geometric cords parallel to the diameter of symmetry within the active element disk shape 120. Each axial slot 122, 126 and the end of the corresponding upward link 142, 166, respectively, mate in a manner that allows the upward links 142, 166 to move easily about the inserted lock pins 132, 176, respectively. The lock pins 132, 176 are inserted through the lock pin holes 121, 125, respectively, of the active element 120 and the upper hole 146, 162, respectively, of each upward link 142, 166. Friction between the wall of an axial slot 122, 126 and the face of a flat upward link 142, 166, respectively, may be minimized by providing narrow inward facing projections 123, 124, 127, 128 as shown in FIGS. 1A and 2, on opposing walls of the axial slots 122, 126, whereby the projections serve as bearing surfaces. A chamfered cavity 129 may be provided in the upper surface of the active element 120 to receive a thrust ball (not shown) to compensate for possible misalignment with an actuator (not shown).

Still with reference primarily to FIG. 2, the lower disk-shaped reactive element 180 has a profile essentially identical to the upper disk-shaped active element 120, while being of approximately the same thickness. The lower disk-shaped reactive element 180 is pierced by two axial slots 184, 188 located in mirror symmetry about the center of the reactive element. A right axial slot 188 is located, for example, forward and to the right of the disk center, while a left axial slot 184 is placed in the mirrored location rearwardly to and to the left of the disk center. The axial slots 184, 188 are shaped and configured to receive ends of the downward links 144, 168 that project from the left and right rocker elements 140, 160, respectively, positioned above the reactive element 180. Each axial slot 184, 188 is intersected by a corresponding lock pin hole 183, 187, respectively, with the lock pin holes being geometric cords parallel to the diameter of symmetry within the reactive element disk shape 180. Each axial slot 184, 188 and the end of the corresponding downward link 144, 168, respectively, mate in a manner that allows the downward links 144, 168 to move easily about inserted lock pins 134, 178. The lock pins 134, 178 are inserted through the lock pin holes 183, 187 of the reactive element 180 and the lower hole 148, 164 of each downward link 144, 168. Friction between the wall of an axial slot 184, 188 and the face of a flat downward link 144, 168, respectively, may be minimized by providing narrow inward facing projections on opposing walls of the axial slot whereby the projections serve as bearing surfaces. One or more threaded holes 189 may be provided in the reactive element 180 to provide connection with valve moving parts (not shown).

The left rocker element 140 is semicircular in shape and has a profile essentially identical to one half of the upper disk-shaped active element 120. It is also of approximately the same axial thickness. The left rocker element 140 is pierced through radially by a pivot pin hole 149 that bisects the semicircular shape. The left rocker element 140 is axially pierced by a front axial slot 141 which is shaped to receive an end of the front left upward link 142 and located coincident with the above positioned left axial slot 122 of the active element 120 above. The front axial slot 141 is intersected by a front lock pin hole 143, wherein the front lock pin hole is parallel to the pivot pin hole 149. The coincident location of the front axial slot 141 and the above left axial slot 122 allows coupling of the left rocker element 140 and the active element 120 by the front left upward link 142 using a first lock pin 133 inserted through the link 142, and the left rocker front lock pin hole 143 along with a second lock pin 132 inserted through the link upper hole 146 and the active element left lock pin hole 121. Additionally, the left rocker element 140 is axially pierced by a rear axial slot 147 shaped to receive an end of the rear left downward link 144 and located coincident with the below positioned left axial slot 184 of the reactive element 180 below. The rear axial slot 147 is intersected by a rear lock pin hole 145, wherein the rear lock pin hole is parallel to the pivot pin hole 149. The coincident location of the rear axial slot 147 and the below positioned left axial slot 184 allows coupling of the left rocker element 140 and the reactive element 180 by the rear left, downward link 144 using a third lock pin 135 inserted through the link 144 and the left rocker rear lock pin hole 145, along with a fourth lock pin 134 inserted through the link lower hole 148 and the reactive element left lock pin hole 183. The distance between the rocker element front lock pin hole 143 and the pivot pin hole 149 may differ from the distance between the rocker element rear lock pin hole 145 and the pivot pin hole 149. Friction between the wall of an axial slot 141, 147 in the left rocker element and the face of a flat link 142, 144 may be minimized by providing narrow inward facing projections on opposing walls of the axial slot whereby the projections serve as bearing surfaces.

The right rocker element 160 is semicircular in shape having a profile essentially identical to one half of the upper disk-shaped active element 120 and being of approximately the same axial thickness. The right rocker element 160 is pierced through radially by a pivot pin hole 169 that bisects the semicircular shape. The right rocker element 160 is axially pierced by a front axial slot 161 shaped to receive an end of the front right downward link 168 and located coincident with the below positioned right axial slot 188 of the reactive element 180 below. The front axial slot 161 is intersected by a front lock pin hole 167, wherein the front lock pin hole is parallel to the pivot pin hole 169. The coincident location of the front axial slot 161 and the below positioned right axial slot 188 allows coupling of the right rocker element 160 and the reactive element 180 by the front right downward link 168 using a fifth lock pin 177 inserted through the link 168 and the right rocker front lock pin hole 167, along with a sixth lock pin 178 inserted through the link lower hole 164 and the reactive element right lock pin hole 187. Additionally, the right rocker element 160 is axially pierced by a rear axial slot 163 shaped to receive an end of the rear right upward link 166 and located coincident with the above positioned right axial slot 126 of the active element 120 above. The rear axial slot 163 is intersected by a rear lock pin hole 165, wherein the rear lock pin hole is parallel to the pivot pin hole 169. The coincident location of the rear axial slot 163 and the above positioned right axial slot 126 allows coupling of the right rocker element 160 and the active element 120 by the rear right upward link 166 using a seventh lock pin 176 inserted through the link upper hole 162 and the active element right lock pin hole 125, along with an eighth lock pin 175 inserted through the link 166 and the rocker element rear lock pin hole 165. The distance between the rocker element front lock pin hole 167 and the pivot pin hole 169 may differ from the distance between the rocker element rear lock pin hole 165 and the pivot pin hole 169. Friction between the wall of an axial slot 161, 163 in the right rocker element and the face of a flat link 168, 166 may be minimized by providing narrow inward facing projections on opposing walls of the axial slot whereby the projections serve as bearing surfaces.

The supporting sleeve 101 is typically held in a fixed location by steps, flanges, or other structures in a valve assembly (not shown). The inside diameter of the supporting sleeve 101 is slightly greater than the outside diameter of the active element 120, the rocker elements 140, 160, and the reactive element 180 so the coupled elements may be fit inside the support sleeve 101 with sufficient clearance to allow motion of the elements. The outside diameter and length of the supporting sleeve 101 may be chosen according to convenience related to other structures in a valve assembly (not shown). The passive pivot pin 190 passes through diametrically opposite pivot pin holes 108, 109 that radially pierce the supporting sleeve 101, or alternatively suitable features may be provided in a valve assembly to hold the passive pivot pin 190 in a fixed axial location without a supporting sleeve. The passive pivot pin 190 also simultaneously passes through the pivot pin hole 149 of the left rocker element 140 and passes through the pivot pin hole 169 of the right rocker element 160. Consequently, the passive pivot pin 190 locates the rocker element pivot pin holes 149, 169 axially fixed relative to an actuator (not shown) secured in the valve assembly. While it is imperative that the left and right rocker elements 140, 160 must be free to rotate independently about the passive pivot pin 190, designers skilled in the art may choose to make the passive pivot pin 190 fit snugly into supporting sleeve pivot pin holes 108, 109 (FIGS. 1A, 1E) or may choose other methods for retaining the passive pivot pin, such as clips.

Actuator force applied to the chamfered cavity 129, or otherwise communicated to the active element 120, is immediately transferred to the rocker elements 140, 160 by the upward links 142, 166 whereby rotation of the rocker elements 140, 160 about the fixed passive pivot pin 190 then reverses the motion direction, and the reversed motion is transferred to the reactive element 180 by the downward links 144, 168. The active element 120 is coupled to the front left upward link 142 by the second lock pin 132 inserted through the link upper hole 146 and the active element left lock pin hole 121. Consequently, downward motion of the active element 120 causes downward motion of the front left upward link 142, thereby pushing downward the first lock pin 133 and the left rocker front lock pin hole 143. This action forces the front portion of the left rocker element 140 to move downward as the left rocker element 140 undergoes a slight rotation about the passive pivot pin 190. The slight rotation of the left rocker element 140 causes the rear portion of the left rocker element 140 to move upwardly, thereby pushing upward the left rocker rear lock pin hole 145 and the third lock pin 135. This action forces the rear left downward link 144 to move upwardly as well. The rear left downward link 144 is coupled to the reactive element 180 by the fourth lock pin 134 inserted through the link lower hole 148 and the reactive element left lock pin hole 183. Consequently, upward motion of the rear left downward link 144 imparts upward motion to the reactive element 180. The active element 120 is also coupled to the rear right upward link 166 by the seventh lock pin 176 inserted through the link upper hole 162 and the active element right lock pin hole 125. Consequently, downward motion of the active element 120 causes downward motion of the rear right upward link 166, thereby pushing downward the eighth lock pin 175 and the right rocker rear lock pin hole 165, thus forcing the rear portion of the right rocker element 160 to move downwardly as the right rocker element 160 undergoes a slight rotation about the passive pivot pin 190. The slight rotation of the right rocker element 160 causes the front portion of the right rocker element 160 to move upwardly, thereby pushing upwardly the right rocker front lock pin hole 167 and the fifth lock pin 177. This action forces the front right downward link 168 to move upward as well. The front right downward link 168 is coupled to the reactive element 180 by the sixth lock pin 178 inserted through the link lower hole 164 and the reactive element right lock pin hole 187. Consequently, upward motion of the front right downward link 168 imparts upward motion to the reactive element 180. The foregoing explains how downward motion of the active element 120 is translated into opposite (upward) motion of the reactive element 180.

Those skilled in the art may appreciate the need to avoid undesirable friction by keeping the active element 120 centered inside the supporting sleeve 101. Parallel motion devices like the direction reversing mechanism assembly 100 can allow the active element 120 to tip and cease being perpendicular to the mechanism central axis whereby undesirable friction also may occur. A flat disk spring 107 attached to the upper surface of the active element 120 and extending to contact the end of the support sleeve 101 is a convenient approach for preventing undesirable friction. The flat disk spring 107 may be attached to the active element 120 by welding, adhesive, small threaded fasteners, or other suitable means.

Figure 4A:
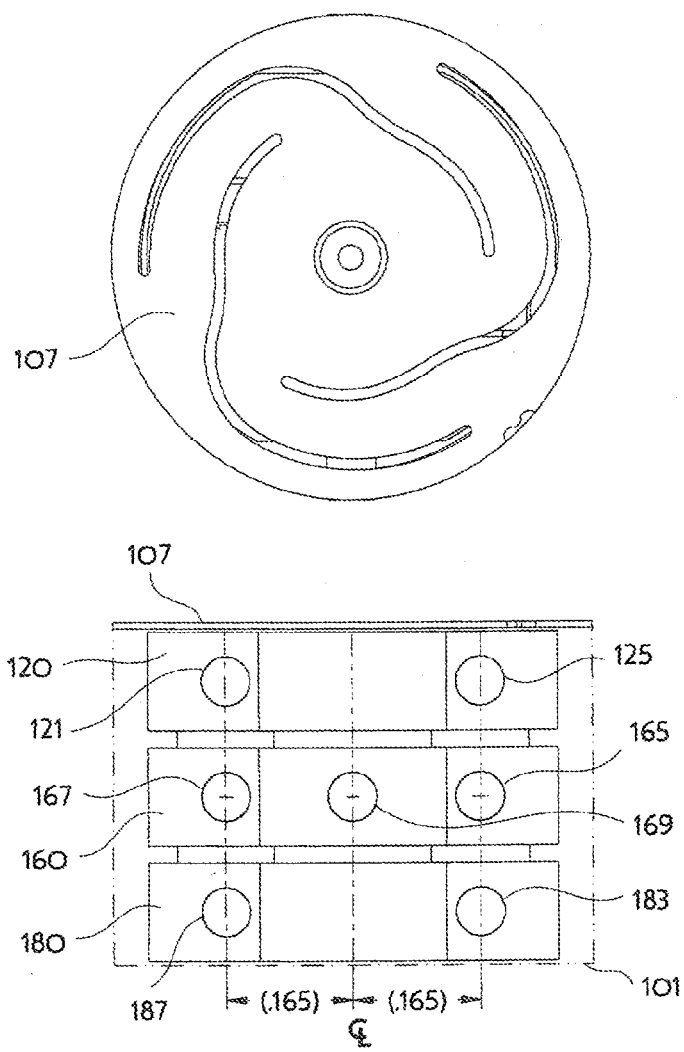
FIG. 4A is an elevation view of the assembly of FIG. 1A illustrating the placement of lock pins relative to the fixed pivot pin for direction reversing motion and equal displacement (1.0:1.0 gain)
Figure 4A:
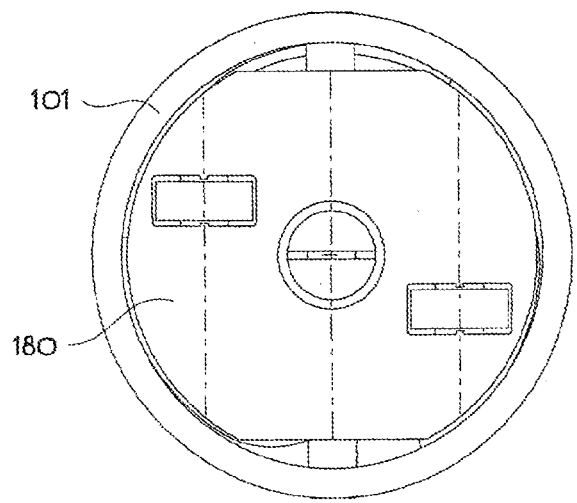

The left rocker element 140 and right rocker element 160 are substantially identical in the illustrated embodiment, and merely rotated by 180 degrees about the direction reversing mechanism central axis. Thus, the rocker lock pin holes 143, 165, enabling connection to the upward links 142, 166, are identically spaced from the pivot pin holes 149, 169. Similarly, the other rocker lock pin holes 145, 167, enabling connection to the downward links 144, 168, also are identically spaced from the pivot pin holes 149, 169, though that spacing distance may be different than is the case for the rocker lock pin holes 143, 165. The ratio of these distances establishes the specific translational multiplication (gain) available from a particular direction reversing mechanism assembly 100. Representative dimensions and resulting movement ratios are shown in Table 1 and illustrated in FIGS. 4A, 4B, and 4C.

the pivot pin holes 149, 169 and the rocker front lock pin holes 143, 167 versus the rocker rear lock pin holes 145, 165, as noted above. As may be seen in FIG. 4A, the lock pin hole placement in the rocker elements is symmetrical. However, in a second representative embodiment of a direction reversing mechanism, as illustrated in FIG. 4B, rocker elements 240, 260 in this second embodiment have lock pin holes that are not symmetrically disposed with respect to the corresponding pivot pin holes. The rear left lock pin hole 245 and the front right lock pin hole 267 are the same distance from the corresponding pivot pin holes 249, 269 as in the first embodiment, and thus make the downward link locations suitable for coincident matching with axial slots 184, 188 in the same reactive element 180. The front left lock pin hole 243 and the rear right lock pin hole 265, however, are disposed at a smaller distance from the corresponding pivot pin holes 249, 269 compared to the first embodiment and thus make the upward link locations different as well. A different active element 220 must be used, having axial slots properly placed to intercept the upward links, for the second embodiment. The ratio of the smaller upward link separation compared to the previous distance in the first embodiment makes the second embodiment rocker elements 240, 260 function as levers that impart more reversed motion to the reactive element than the actuator imparts to the active element.

A third embodiment of the direction reversing assembly of the invention is shown in FIG. 4C. In this embodiment, the rocker elements 340, 360 have lock pin holes that are not symmetrically disposed with respect to the corresponding pivot pin holes. The rear left lock pin hole 345 and the front right lock pin hole 367 are a smaller distance from the corresponding pivot pin holes 349, 369 compared to the previous first and second embodiments and thus make the downward link locations different as well. A different reactive element 380 must be used, having axial slots properly placed to intercept the downward links, for the third embodiment of FIG. 4C. The front left lock pin hole 343 and the rear right lock pin hole 365 are placed at the same distance from the corresponding pivot pin holes 349, 369 as in the first embodiment, and thus make the upward link locations suitable for coincident matching with axial slots 124, 128 in the same first embodiment active element 120. The ratio of the smaller downward link separation compared to the previous distance makes the third embodiment rocker elements 340, 360 function as levers that impart less reversed motion to the reactive element than the actuator imparts to the active element.

TABLE 1

| Direction Reversing Mechanism Assembly Figure | left rocker element front lock pin hole (upward link) to pivot pin hole spacing | left rocker element rear lock pin hole (downward link) to pivot pin hole spacing | left rocker ratio of active element connection to reactive element connection | right rocker element front lock pin hole (downward link) to pivot pin hole spacing | right rocker element near lock pin hole (upward link) to pivot pin hole spacing | right rocker ratio of active element connection to reactive element connection | ratio of reversed motion |
|---|---|---|---|---|---|---|---|
| 4A | 0.165" | 0.165" | 1.0 | 0.165" | 0.165" | 1.0 | 1.0 |
| 4B | 0.110" | 0.165" | 0.67 | 0.165" | 0.110" | 0.67 | 1.5 |
| 4C | 0.165" | 0.110" | 1.5 | 0.110" | 0.165" | 1.5 | 0.67 |

Retention of the eight lock pins may be accomplished by providing a snug fit in the holes of link elements, or a snug fit in the lock pin holes in the various full and partial disk-shaped elements, or a suitable combination of these or other choices (e.g. threads, adhesive, staking, etc.), as optimized for particular manufacturing methods.

Figure 5D:
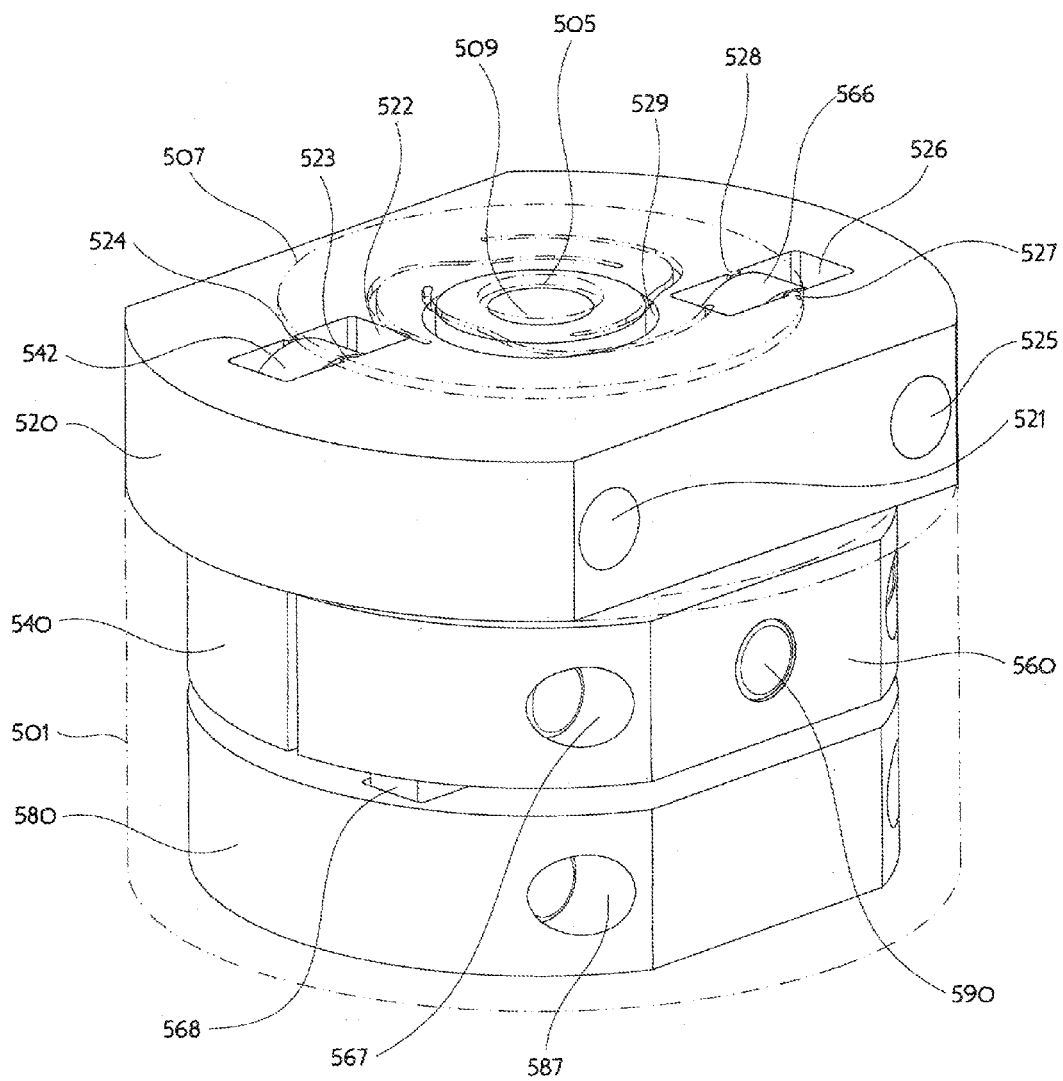
FIG. 5D is a representative direction preserving mechanism illustrated in isometric perspective view with a disk-shaped passive element upward nearest to the actuator.
Figure 6:
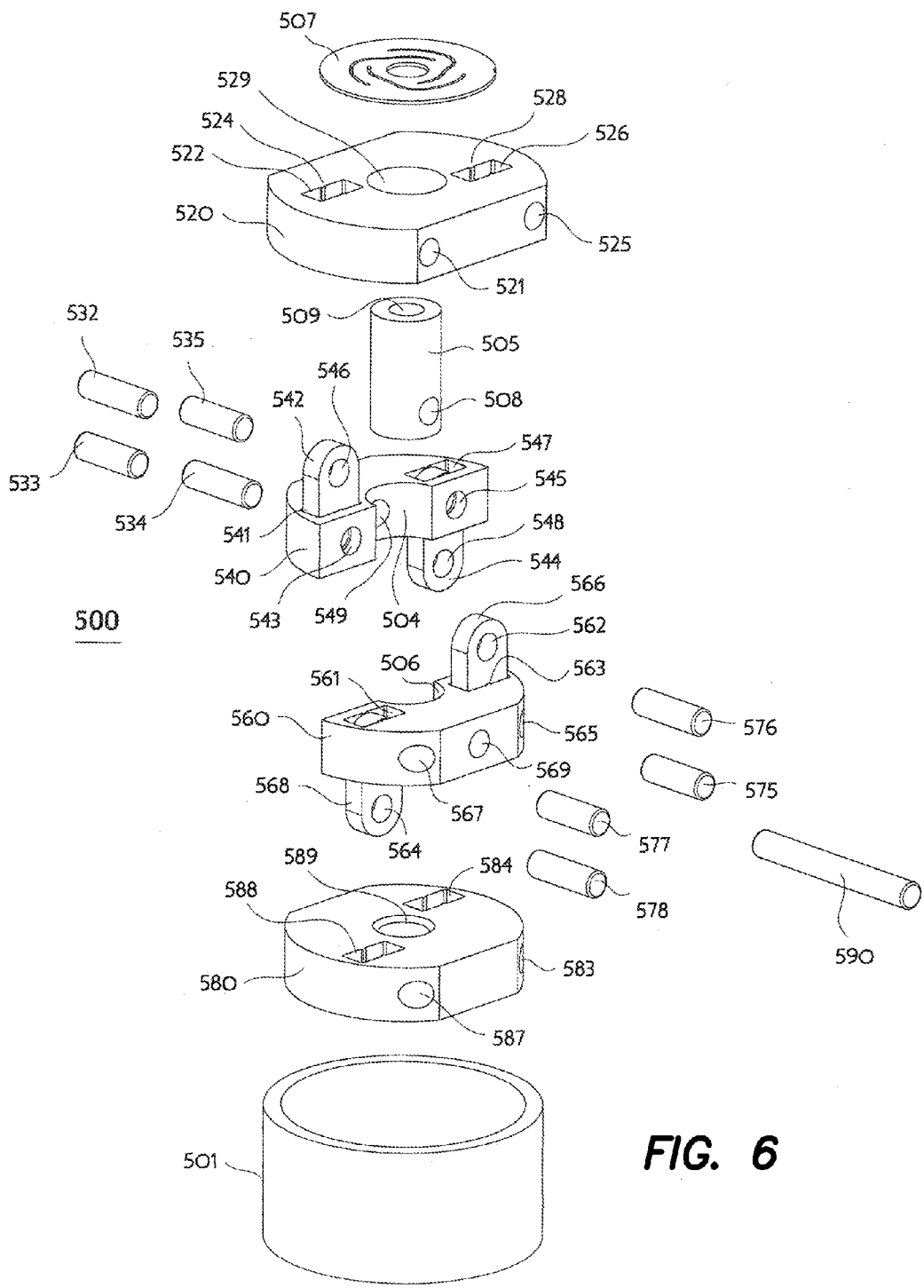
FIG. 6 is an exploded view of the direction-preserving mechanism of FIG. 5D.
Figure 7A:
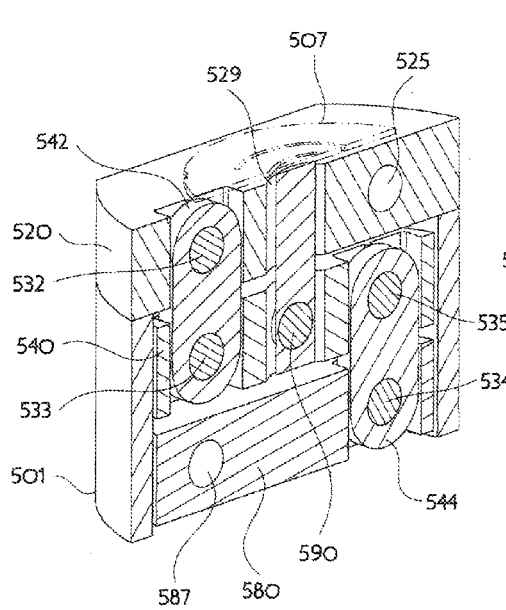
FIG. 7A is the representative mechanism of FIG. 5D axially sectioned along a cord bisecting the upward and downward links of a rocker element.
Figure 7B:
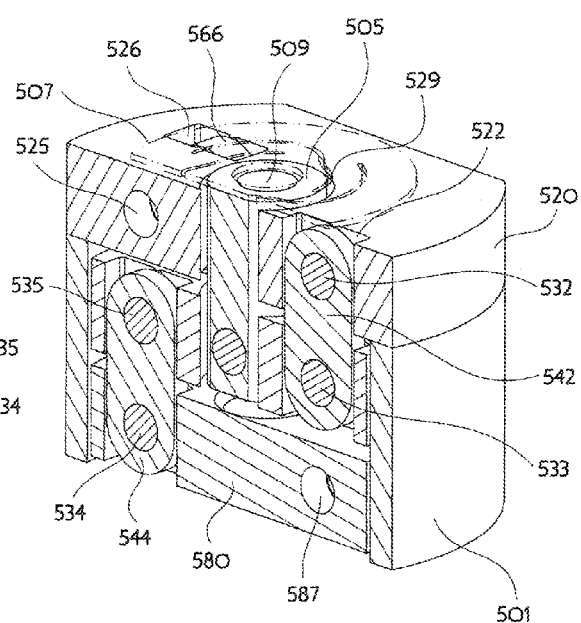
FIG. 7B is the corresponding residual from FIG. 7A illustrating the second axial slot in the upper passive element, wherein another link is engaged to couple with the other rocker element.

The previously described first representative example of a direction-reversing mechanism assembly 100, illustrated in FIGS. 1A-1F, 2, 3A, and 3B, has the same distance between A first representative embodiment of a movement increasing mechanism assembly 500 constructed in accordance with the principles of the present invention is illustrated in FIG. 5D. The assembly 500 has an upward directed axially centered active shaft 505 for coupling force from an actuator (not shown). The active shaft 505 passes through a centered axial hole 529 that pierces a disk-shaped passive element 520 comprising the uppermost portion of the movement increasing mechanism assembly 500. Directly below the disk-shaped passive element 520 is a semicircular left rocker element 540 and an adjacent semicircular right rocker element 560. Both of the rocker elements 540, 560 are simultaneously situated upon an active pivot pin 590. The rocker elements 540, 560 additionally have axially centered semicircular reliefs 504, 506 (making each rocker element similar to one half of a wide ring shape) (FIG. 6) which allow the active shaft 505 to also engage the active pivot pin 590. Directly below the rocker elements 540, 560 is a disk-shaped reactive element 580 nearest to movable elements of a valve (not shown). One end of each rocker element is coupled to the passive element 520 while the other end of each rocker element is coupled to the reactive element 580. The mechanism assembly 500 may be made from a variety of materials, such as metals, plastics, composites, or ceramics, but heat treated tool steels, such as A2, D2 or H13, or a heat treated stainless steel having spring-like characteristics, such as 17-4PH alloy, are considered appropriate to many applications, while aluminum alloys such as 6061 may also be used. The movement increasing mechanism assembly 500 of the illustrated embodiment has an outside diameter of about 0.6 inch with an axial length of about 0.5 inch and may be optionally surrounded by a supporting sleeve 501 that is illustrated using phantom lines in FIG. 5D.

The mechanical coupling of the passive element 520, two rocker elements 540, 560, and the reactive element 580 will be described further in connection with discussion of FIGS. 5A, 5B, 5C, 5D, 6, 7A, and 7B. A typical means for coupling the rocker elements 540, 560 to the passive element 520 and the reactive element 580 is by the use of links and lock pins, as in the prior embodiments. For convenience of identification only, links connecting rocker elements 540, 560 to the passive element 520 are referred to as upward links 542, 566, while links connecting rocker elements 540, 560 to the reactive element 580 are referred to as downward links 544, 568. Upward links 542, 566 and downward links 544, 568 may be of various shapes (circular or rectangular cross-section, for example), but a simple flat part with circular holes through the thin dimension, and rounded ends about those holes, is conveniently manufactured. To preserve symmetry and proper function of the movement increasing mechanism assembly 500, upward links 542, 566 are generally identical and downward links 544, 568 are generally identical, but upward links may differ in configuration from downward links. Links have an upper hole 546, 562 and a lower hole 548, 564 through which corresponding lock pins 532, 576, 534, 578, respectively, are inserted to effect connection between a link and an appropriate element of the movement increasing mechanism assembly 500.

Mechanical action of the movement increasing mechanism assembly 500 may be understood by appreciating that downward movement of the active pivot pin 590 will cause slight rotation of a rocker element 540, 560 about an axially fixed lock pin 533, 575 that couples one end of the rocker element to an upward link 542, 566. The slight rotation results in further downward motion of a lock pin 535, 577 that couples the other end of the same rocker element to a downward link 544, 568, moving that link downward toward the reactive element 580. Appropriate mechanical coupling of one end of each rocker element 540, 560 to the passive element 520, in combination with similar mechanical coupling of the corresponding other end of each rocker element 540, 560 to the reactive element 580, thus causes increased movement of the reactive element 580. Upward movement of the active pivot pin 590 will of course result in a corresponding increased upward movement of the reactive element 580.

The upper disk-shaped passive element 520 is pierced by two axial slots 522, 526 located in mirror symmetry about the center of the passive element. A left axial slot 522 is located, for example, forward and to the left of the disk center, while a right axial slot 526 is placed in the mirrored location rearward and to the right of the disk center. The axial slots 522, 526 are shaped to receive ends of upward links 542, 566 that project from the left and right rocker elements 540, 560 positioned below the passive element 520. Each axial slot 522, 526 is intersected by a corresponding lock pin hole 521, 525, with the lock pin holes being geometric cords parallel to the diameter of symmetry within the passive element disk shape 520. Each axial slot 522, 526 and the end of the corresponding upward link 542, 566 mate in a manner that allows the upward links 542, 566 to move easily about the inserted lock pins 532, 576. The lock pins are inserted through the lock pin holes 521, 525 of the passive element 520 and the upper hole 546, 562 of each upward link 542, 566. Friction between the wall of an axial slot 522, 526 and the face of a flat upward link 542, 566 may be minimized by providing narrow inward facing projections 523, 524, 527, 528 on opposing walls of the axial slot 522, 526 whereby the projections serve as bearing surfaces. The upper disk-shaped passive element 520 is additionally pierced by the centered axial hole 529 through which passes the upward directed axially centered active shaft 505. The active shaft 505 is radially pierced by a diametrical shaft pin hole 508 which engages the active pivot pin 590 to transmit force from an actuator (not shown). A chamfered cavity 509 may be provided in the upper end surface of the active shaft 505 to receive a thrust ball (not shown) to compensate for possible misalignment with the actuator.

The lower disk-shaped reactive element 580 has a profile similar to the upper disk-shaped passive element 520, but of smaller external diameter, while being of approximately the same thickness. The reactive element 580 is pierced by two axial slots 584, 588 located in mirror symmetry about the center of the reactive element. A right axial slot 588 is located, for example, forward and to the right of the disk center while a left axial slot 584 is placed in the mirrored location rearwardly and to the left of the disk center. The axial slots 584, 588 are shaped to receive ends of downward links 544, 568 that project from the left and right rocker elements 540, 560 positioned above the reactive element 580. Each axial slot 584, 588 is intersected by a corresponding lock pin hole 583, 587, with the lock pin holes being geometric cords parallel to the diameter of symmetry within the reactive element disk shape 580. Each axial slot 584, 588 and the end of the corresponding downward link 544, 568 mate in a manner that allows the downward links 544, 568 to move easily about inserted lock pins 534, 578. The lock pins 534, 578 are inserted through the lock pin holes 583, 587 of the reactive element 580 and the lower hole 548, 564 of each downward link 544, 568. Friction between the wall of an axial slot 584, 588 and the face of a flat downward link 544, 568 may be minimized by providing narrow inward facing projections on opposing walls of the axial slot whereby the projections serve as bearing surfaces. One or more threaded holes 589 may be provided in the reactive element 580 to provide connection with valve moving parts (not shown).

The left rocker element 540 is semicircular in shape, having a profile similar to one half of the upper disk-shaped passive element 520, but of smaller external diameter while being of approximately the same axial thickness. The left rocker element 540 is pierced through radially by a pivot pin hole 549 that bisects the semicircular shape. The left rocker element 540 is axially pierced by a front axial slot 541 shaped to receive an end of the front left upward link 542 and located coincident with the above positioned left axial slot 522 of the passive element 520 above. The front axial slot 541 is intersected by a front lock pin hole 543 wherein the front lock pin hole is parallel to the pivot pin hole 549. The coincident location of the front axial slot 541 and the above positioned left axial slot 522 allows coupling of the left rocker element 540 and the passive element 520 by the front left upward link 142 using a first lock pin 533 inserted through the link 542 and the left rocker front lock pin hole 543 along with a second lock pin 532 inserted through the link upper hole 546 and the passive element left lock pin hole 521. Additionally, the left rocker element 540 is axially pierced by a rear axial slot 547 shaped to receive an end of the rear left downward link 544 and located coincident with the below positioned left axial slot 584 of the reactive element 580 below. The rear axial slot 547 is intersected by a rear lock pin hole 545, wherein the rear lock pin hole is parallel to the pivot pin hole 549. The coincident location of the rear axial slot 547 and the below positioned left axial slot 584 allows coupling of the left rocker element 540 and the reactive element 580 by the rear left downward link 544 using a third lock pin 535 inserted through the link 544 and the left rocker rear lock pin hole 545 along with a fourth lock pin 534 inserted through the link lower hole 548 and the reactive element left lock pin hole 583. The distance between the rocker element front lock pin hole 543 and the pivot pin hole 549 may differ from the distance between the rocker element rear lock pin hole 545 and the pivot pin hole 549. Friction between the wall of an axial slot 541, 547 in the left rocker element and the face of a flat link 542, 544 may be minimized by providing narrow inward facing projections on opposing walls of the axial slot whereby the projections serve as bearing surfaces. The left rocker element 540 additionally has an axially centered semicircular relief 504 (making the rocker element similar to one half of a wide ring shape) which allows the active shaft 505 to also engage the active pivot pin 590 which passes through the pivot pin hole 549.

The right rocker element 560 is semicircular in shape and has a profile similar to one half of the upper disk-shaped passive element 520, but of smaller external diameter while being of approximately the same axial thickness. The right rocker element 560 is pierced through radially by a pivot pin hole 569 that bisects the semicircular shape. The right rocker element 560 is axially pierced by a front axial slot 561 shaped to receive an end of the front right downward link 568 and located coincident with the below positioned right axial slot 588 of the reactive element 580 below. The front axial slot 561 is intersected by a front lock pin hole 567, wherein the front lock pin hole is parallel to the pivot pin hole 569. The coincident location of the front axial slot 561 and the below positioned right axial slot 588 allows coupling of the right rocker element 560 and the reactive element 580 by the front right downward link 568 using a fifth lock pin 577 inserted through the link 568 and the right rocker front lock pin hole 567 along with a sixth lock pin 578 inserted through the link lower hole 564 and the reactive element right lock pin hole 587. Additionally, the right rocker element 560 is axially pierced by a rear axial slot 563 shaped to receive an end of the rear right upward link 566 and located coincident with the above positioned right axial slot 526 of the passive element 520 above. The rear axial slot 563 is intersected by a rear lock pin hole 565 wherein the rear lock pin hole is parallel to the pivot pin hole 569. The coincident location of the rear axial slot 563 and the above positioned right axial slot 526 allows coupling of the right rocker element 560 and the passive element 520 by the rear right upward link 566 using a seventh lock pin 576 inserted through the link upper hole 562 and the active element right lock pin hole 525, along with an eighth lock pin 575 inserted through the link 566 and the rocker element rear lock pin hole 565. The distance between the rocker element front lock pin hole 567 and the pivot pin hole 569 may differ from the distance between the wall of an axial slot 561, 563 in the right rocker element rear lock pin hole 565 and the pivot pin hole 569. Friction between the wall of an axial slot 561, 563 in the right rocker element and the face of a flat link 568, 566 may be minimized by providing narrow inward facing projections on opposing walls of the axial slot whereby the projections serve as bearing surfaces. The right rocker element 560 additionally has an axially centered semicircular relief 506 (making the rocker element similar to one half of a wide ring shape), which allows the active shaft 505 to also engage the active pivot pin 590 which passes through the pivot pin hole 569.

A supporting sleeve 501 is typically held in a fixed location by steps, flanges, or other structures in a valve assembly (not shown). The inside diameter of the supporting sleeve 501 is slightly greater than the outside diameter of the rocker elements 540, 560 and the reactive element 580, but smaller than the outside diameter of the passive element 520. This arrangement causes the supporting sleeve 501 to hold the passive element 520 axially fixed, while the other coupled elements may be fit inside the support sleeve 501 with sufficient clearance to allow the motion of the elements. The outside diameter and length of the supporting sleeve 501 may be chosen according to convenience related to other structures in a valve assembly (not shown). Alternatively, suitable features may be provided in a valve assembly to hold the passive element 520 in a fixed axial location without a supporting sleeve 501. Mechanical coupling among the elements of the movement increasing mechanism assembly 500 has been previously described regarding links and lock pins. It is to be further understood that mechanical coupling of the active shaft 505 to the rocker elements 540, 560 is effected by the active pivot pin 590 simultaneously passing through the pivot pin hole 549 of the left rocker element 540, though the shaft pin hole 508, and through the pivot pin hole 569 of the right rocker element 560. While it is imperative that the left and right rocker elements 540, 560 must be free to rotate independently about the active pivot pin 590, those skilled in the art may choose to make the active pivot pin 590 fit snugly into the shaft pin hole 508 or may choose other methods for retaining the active pivot pin such as clips (not shown).

Actuator force applied to the chamfered cavity 509 in the upper end surface of the active shaft 505, or otherwise communicated to the active pivot pin 590, is immediately transferred to the rocker elements 540, 560 by the pivot pin holes 549, 569 located diametrically opposite to one another. The passive element 520 is coupled to the front left upward link 542 by the second lock pin 532 inserted through the link upper hole 546 and the passive element left lock pin hole 521. Consequently, the passive element 520 being held in an axially fixed location also holds the front left upward link 542 axially fixed, and thereby further holds the first lock pin 533 and the left rocker front lock pin hole 543 axially fixed. Motion imparted to the left rocker pivot pin hole 549 thus makes the left rocker element 540 undergo a slight rotation about the front lock pin hole 543. The slight rotation of the left rocker element 540 causes the rear portion of the left rocker element 540 to move in the same direction by a greater amount with the left rocker rear lock pin hole 545 and the third lock pin 535 thus forcing the rear left downward link 544 to move as well. The rear left downward link 544 is coupled to the reactive element 580 by the fourth lock pin 534 inserted through the link lower hole 548 and the reactive element left lock pin hole 583. Consequently, downward motion of the active shaft 505 causes downward motion of the rear left downward link 544 which imparts downward motion to the reactive element 580. The passive element 520 is also coupled to the rear right upward link 566 by the seventh lock pin 576 inserted through the link upper hole 562 and the passive element right lock pin hole 525. Consequently, the passive element 520 being held in an axially fixed location also holds the rear right upward link 566 axially fixed and thereby further holds the eighth lock pin 575 and the right rocker rear lock pin hole 565 axially fixed. Motion imparted to the right rocker pivot pin hole 569 thus makes the right rocker element 560 undergo a slight rotation about the rear lock pin hole 565. The slight rotation of the right rocker element 560 causes the front portion of the right rocker element 560 to move in the same direction by a greater amount with the right rocker front lock pin hole 567 and the fifth lock pin 577, thus forcing the front right downward link 568 to move as well. The front right downward link 568 is coupled to the reactive element 580 by the sixth lock pin 578 inserted through the link lower hole 564 and the reactive element right lock pin hole 587. Consequently, downward motion of the active shaft 505 causes downward motion of the front right downward link 568 which imparts downward motion to the reactive element 580. The foregoing explains how movement of the active shaft 505 is translated into increased movement of the reactive element 580 in the same direction.

Undesirable friction in the mechanism is avoided by keeping the active shaft 505 centered inside the corresponding central axial hole 529, which pierces the upper disk-shaped passive element 520. A flat disk spring 507 attached to the upper surface of the passive element 520 and extending to contact the end of the upper surface of the passive element 520 is a convenient approach for preventing undesirable friction. The flat disk spring 507 may be attached to the active shaft by welding, adhesive, staking to a ridge (not shown) around the perimeter of the chamfered cavity 509, or other suitable means.

In the disclosed embodiment, the left rocker element 540 and right rocker element 560 are substantially identical and merely rotated by 180 degrees about the movement-increasing mechanism central axis. Additionally, the rocker lock pin holes 543, 565 enabling connection to the upward links 542, 566 are spaced at a substantially identical distance from the pivot pin holes 549, 569. The other rocker lock pin holes 545, 567, enabling connection to the downward links 544, 568, also are spaced at a substantially identical distance from the pivot pin holes 549, 569, though that distance may be different. The ratio of these respective distances establishes the specific translational multiplication (gain) desired from a particular movement increasing mechanism assembly. Representative dimensions and resulting movement ratios are shown in Table 2 and illustrated particularly in FIGS. 8A, 8B, and 8C. Retention of the eight lock pins may be accomplished by providing a snug fit in the holes of the link elements, or a snug fit in the lock pin holes in the various full and partial disk-shaped elements, or a suitable combination of these or other choices (e.g. threads, adhesive, staking, etc.) as optimized for particular manufacturing methods.

Figure 8A:
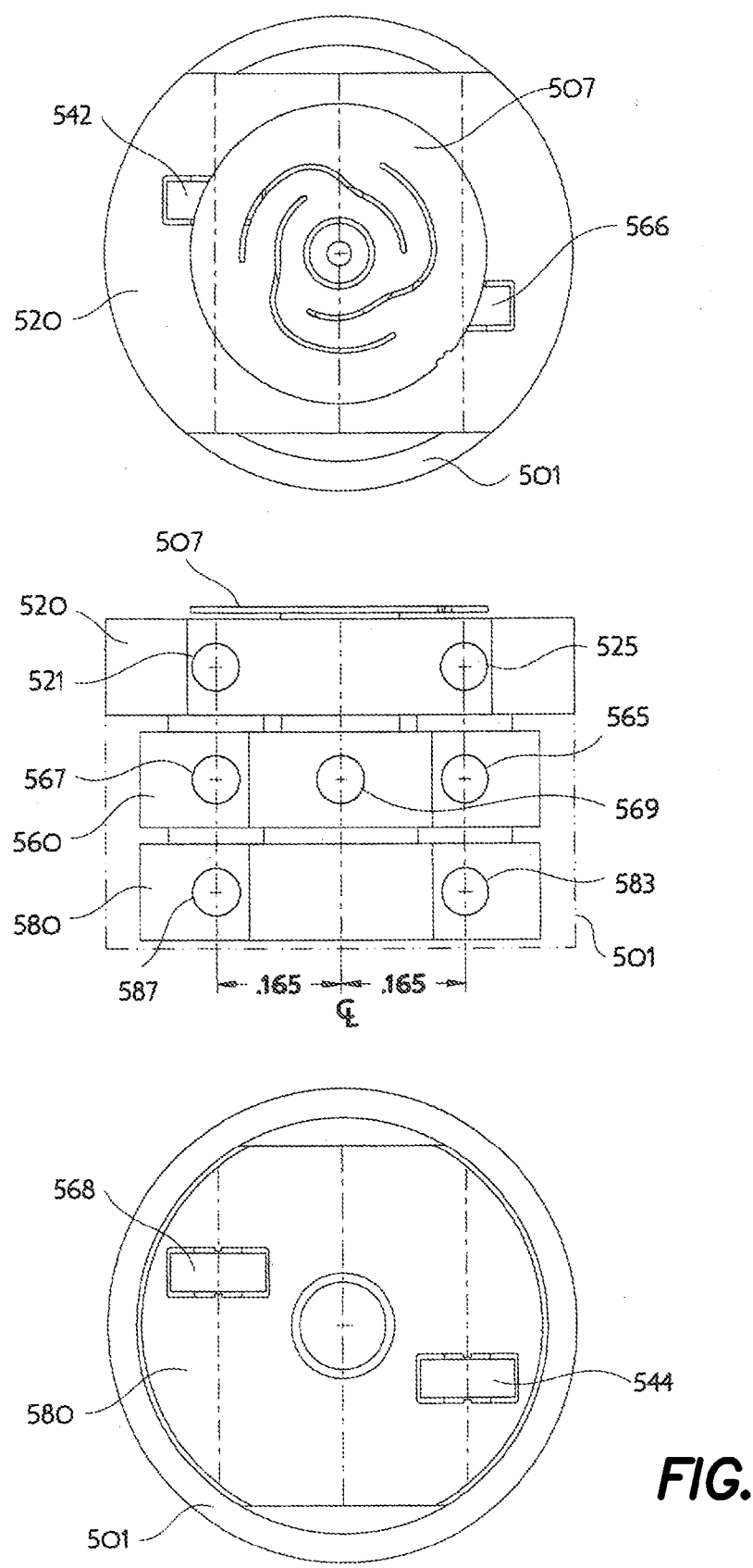
FIG. 8A is an elevation view of the assembly of FIG. 5D, illustrating the placement of lock pins relative to the active pivot pin for direction-preserving motion with doubled displacement (1.0:2.0 gain)

The embodiment discussed so far, in connection with FIGS. 5A, 5B, 5C, 5D, 6, 7A, and 7B, has the same distance between the pivot pin holes 549, 569 and the rocker front lock pin holes 543, 567 as between the pivot pin holes 549, 569 and the rocker rear lock pin holes 545, 565. As may be seen in FIG. 8A, the lock pin hole placement in the rocker elements is symmetrical for this embodiment. However, a second modified embodiment of the movement increasing mechanism 500 is illustrated in FIG. 8B, wherein the rocker elements 640, 660 have lock pin holes that are not symmetrically located with respect to the corresponding pivot pin holes. The rear left lock pin hole 645 and the front right lock pin hole 667 are the same distance from the corresponding pivot pin holes 649, 669 as in the prior embodiment, and thus make the downward link locations suitable for coincident matching with axial slots 584, 588 in the same reactive element 580. The front left lock pin hole 643 and the rear right lock pin hole 665 are located a smaller distance from the corresponding pivot pin holes 649, 669 compared to the previous embodiment, and thus make the upward link locations different as well. A different passive element 620 must be used, having axial slots properly placed to intercept the upward links, for the second embodiment of FIG. 8B. The ratio of the smaller upward link separation compared to the previous distance makes the second example rocker elements 640, 660 function as levers that impart more increased motion to the reactive element 580 than the actuator imparts to the active shaft 505.

A third modified embodiment of a direction reversing mechanism 500 constructed in accordance with the principles of the present invention is illustrated in FIG. 8C, wherein modified rocker elements 740, 760 have lock pin holes that are not symmetrically placed with respect to the corresponding pivot holes. The rear left lock pin hole 745 and the front right lock pin hole 767 are a smaller distance from the corresponding pivot pin holes 749, 769 compared to the prior embodiments, and thus make the downward link locations different as well. A different reactive element 780 must be used, having axial slots properly placed to intercept the downward links, for this embodiment. The front left lock pin hole 743 and the rear right lock pin hole 765 are located at substantially the same distance from the corresponding pivot pin holes 749, 769, and in the previous embodiment, and thus make the upward link locations suitable for coincident matching with axial slots 524, 528 in the same first embodiment active element 520. The ratio of the smaller downward link separation compared to the previous distance makes the rocker elements 740, 760 of this embodiment function as levers that impart less increased motion to the reactive element 780 than the actuator imparts to the active shaft 505.

TABLE 2

| Movement Increasing Mechanism Assembly Figure | left rocker element front lock pin hole (upward link) to pivot pin hole | left rocker element rear lock pin hole (downward link) to pivot pin hole | left rocker ratio of active shaft movement to reactive element movement | right rocker element front lock pin hole (downward link) to pivot pin hole | right rocker element rear lock pin hole (upward link) to pivot pin hole | right rocker ratio of active shaft movement to reactive element movement | ratio of movement increase |
|---|---|---|---|---|---|---|---|
| 8A | 0.165" | 0.165" | 0.5 | 0.165" | 0.165" | 0.5 | 2.0 |
| 8B | 0.110" | 0.165" | 0.4 | 0.165" | 0.110" | 0.4 | 2.5 |
| 8C | 0.165" | 0.110" | 0.6 | 0.110" | 0.165" | 0.6 | 1.67 |

Thus, as can be seen from a review of the foregoing description and accompanying drawings, the inventive system and methods involve an innovative mechanical coupling between an actuator, such as a piezoelectric actuator, and a valve, such as a diaphragm valve. The coupling permits the stroke to be adjusted (expanded, contracted, or reversed), and operates using a scissor-lift concept.

While this invention has been described with respect to various specific examples and embodiments, it is to be understood that various modifications may be made without departing from the scope thereof. Therefore, the above description should not be construed as limiting the invention, but merely as an exemplification of preferred embodiments thereof and that the invention can be variously practiced within the scope of the following claims.

What is claimed is:

1. A mechanical motion converter for use in actuating a valve, comprising:
   an active valve actuating element;
   a reactive valve actuating element;
   a pivot pin; and
   a left rocker element and a right rocker element, each of the rocker elements being pivotally supported by the pivot pin, the rocker elements each being disposed axially between the active valve actuating element and the reactive valve actuating element, each of said rocker elements comprising an upward link and a downward link; and
   an axial slot in each of the active valve actuating element and the reactive valve actuating element for receiving an end of a corresponding one of the links;
   wherein the active valve actuating element, the reactive valve actuating element, and the left and right rocker elements are joined together and translate axially in response to a force exerted by an actuator.

2. The mechanical motion converter as recited in claim 1, wherein each of the active valve actuating element and the reactive valve actuating element are disk-shaped.

3. The mechanical motion converter as recited in claim 1, wherein the pivot pin is passive, such that it is axially fixed within the mechanism.

4. The mechanical motion converter as recited in claim 1, wherein the pivot pin is active, such that it is axially translatable relative to remaining portions of the mechanism.

5. The mechanical motion converter as recited in claim 1, wherein each of said links comprises a flat member having a hole therethrough and rounded ends.

6. The mechanical motion converter as recited in claim 1, and further comprising:
   a hole in each of the links;
   a hole in each of the active valve actuating element and the reactive valve actuating element; and
   a plurality of lock pins for engaging corresponding holes in the links and the active and reactive elements to secure the active element, the links, and the reactive element together in a manner permitting relative axial movement of each joined component.

7. The mechanical motion converter as recited in claim 6, and further comprising a hole in each of the rocker elements for receiving one or more of the lock pins to further secure the active valve actuating element, the links, and the active and reactive valve actuating elements together.

8. The mechanical motion converter as recited in claim 1, and further comprising an axial slot in each of the rocker elements, for receiving an opposing end of links extending from one of the active valve actuating element and the reactive valve actuating element.

9. The mechanical motion converter as recited in claim 8, wherein each of the active valve actuating element, the reactive valve actuating element, and the left and right rocker elements comprise two axial slots for receiving lock pin ends.

10. The mechanical motion converter as recited in claim 1, and further comprising a flat disk spring attached to an upper surface of the active valve actuating element.

11. The mechanical motion converter as recited in claim 7, wherein each of the rocker elements comprises a hole for receiving the pivot pin and two holes for receiving lock pins, the two lock pin holes being disposed on opposed sides of the pivot pin hole.

12. The mechanical motion converter as recited in claim 11, wherein the two lock pin holes on each rocker element are substantially identically spaced from the pivot pin hole and axial movement of the active valve actuating element is substantially equal to axial movement of the reactive valve actuating element responsive to a force applied by an actuator.

13. The mechanical motion converter as recited in claim 11, wherein the two lock pin holes on each rocker element are differently spaced from the pivot hole, and axial movement of the active valve actuating element is greater than axial movement of the reactive valve actuating element responsive to a force applied by an actuator.

14. The mechanical motion converter as recited in claim 11, wherein the two lock pin holes on each rocker element are differently spaced from the pivot hole, and axial movement of the active valve actuating element is less than axial movement of the reactive valve actuating element responsive to a force applied by an actuator.

15. The mechanical motion converter as recited in claim 1, wherein the active valve actuating element and the reactive valve actuating element move in the same axial direction responsive to a force applied by an actuator.

16. The mechanical motion converter as recited in claim 1, wherein the active valve actuating element and the reactive valve actuating element move in opposing axial directions responsive to a force applied by an actuator.

* * * * *